US012585876B2

(12) United States Patent
Park et al.

(10) Patent No.: US 12,585,876 B2
(45) Date of Patent: Mar. 24, 2026

(54) METHOD OF TRAINING POS TAGGING MODEL, COMPUTER-READABLE RECORDING MEDIUM AND POS TAGGING METHOD

(71) Applicants:Hyundai Motor Company, Seoul (KR); KIA CORPORATION, Seoul (KR)

(72) Inventors: Cheoneum Park, Seongnam-Si (KR); Juae Kim, Seoul (KR); Cheongjae Lee, Suwon-si (KR); Soo Jong Do, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 316 days.

(21) Appl. No.: 18/205,615

(22) Filed: Jun. 5, 2023

(65) Prior Publication Data

US 2024/0037337 A1 Feb. 1, 2024

(30) Foreign Application Priority Data

Jul. 28, 2022 (KR) ........................ 10-2022-0094262

(51) Int. Cl.
*G06F 40/284* (2020.01)
*G06F 40/205* (2020.01)
*G06F 40/268* (2020.01)

(52) U.S. Cl.
CPC .......... *G06F 40/284* (2020.01); *G06F 40/205* (2020.01); *G06F 40/268* (2020.01)

(58) Field of Classification Search
CPC ..... G06F 40/284; G06F 40/268; G06F 40/205
See application file for complete search history.

(56) References Cited

U.S. PATENT DOCUMENTS

| | | | |
|---|---|---|---|
| 10,198,435 B2 | 2/2019 | Na | |
| 10,930,267 B2 | 2/2021 | Kim et al. | |
| 2019/0258713 A1* | 8/2019 | Kiros | G06N 3/08 |
| 2020/0090642 A1 | 3/2020 | Lee | |

(Continued)

FOREIGN PATENT DOCUMENTS

| | | | |
|---|---|---|---|
| CN | 111145732 A | 5/2020 | |
| CN | 111563167 A | 8/2020 | |
| CN | 113392651 A * | 9/2021 | G06N 3/044 |

(Continued)

OTHER PUBLICATIONS

Chen, et al., A boundary assembling method for nested biomedical named entity recognition. IEEE Access, 8, 2020 (Year: 2020).*

(Continued)

*Primary Examiner* — Bhavesh M Mehta
*Assistant Examiner* — Eunice Lee
(74) *Attorney, Agent, or Firm* — Banner & Witcoff, Ltd.

(57) ABSTRACT

A method of training a part-of-speech (POS) tagging model includes: separating an input sentence into units of syllables to generate an input sequence; encoding, using at least one encoder included in a part-of-speech (POS) tagging model, the input sequence; generating, based on the encoded input sequence and using a first discriminator included in the POS tagging model, a POS tagging result; and generating, based on the encoded input sequence and using a second discriminator included in the POS tagging model, a spacing result.

20 Claims, 19 Drawing Sheets

(56) References Cited

U.S. PATENT DOCUMENTS

| | | | |
|---|---|---|---|
| 2021/0174789 A1 | 6/2021 | Hwang et al. | |
| 2022/0012425 A1* | 1/2022 | Li | G06N 3/0455 |

FOREIGN PATENT DOCUMENTS

| | | | | |
|---|---|---|---|---|
| CN | 113723103 A | * | 11/2021 | ........... G06F 40/295 |
| CN | 114418069 A | * | 4/2022 | ............. G06F 18/24 |
| CN | 114638214 B | * | 11/2024 | ............. G06N 3/044 |
| KR | 20150066361 A | | 6/2015 | |
| KR | 20170057792 A | | 5/2017 | |
| KR | 20190002812 A | | 1/2019 | |
| KR | 20200030789 A | | 3/2020 | |
| KR | 20240008635 A | * | 1/2024 | ........... G06V 30/413 |
| WO | WO-2022183138 A2 | * | 9/2022 | ............. G10L 25/63 |

OTHER PUBLICATIONS

Moon-pyo et al., "Morphological Analysis for Korean Compounded Morpheme Using Whiter Space Information", Proceedings presented at the Korean Information Science Society Human Computer Interaction Study Conference (HCI), vol. 2, Feb. 2003, 5 pages.

Choi et al., "Korean Morphological Analyzer for Neologism and Spacing Error based on Sequence-to-Sequence", Journal of the Information Science Society, vol. 47, No. 1, Jan. 2020, 8 pages.

Lee, Changki "Joint Models for Korean Word Spacing and POS Tagging using Structural SVM", Journal of the Society for Information Science: Software and Applications, vol. 40, No. 12, Dec. 2013, 7 pages.

Kim et al. "Implementation of Word-Segmentation for Korean using Information of Syllable", Korean Information Science Society Fall 1997 Journal of Journalism, vol. 24, No. 2, Oct. 1997, 4 pages.

Kwang-seop, Sim "Automatic Word Spacing Using Raw Corpus and a Morphological Analyzer", Journal of the Information Science Society, vol. 42, No. 1, Jan. 2015, 8 pages.

Lei et al. "Simple Recurrent Units for Highly Parallelizable Recurrence", arXiv:1709.02755, vol. 5, Sep. 2018, 15 pages.

Lei, Tao "When Attention Meets Fast Recurrence: Training Language Models with Reduced Compute", arXiv:2102.12459, vol. 3, Sep. 2021, 16 pages.

Park et al. "S3-Net: Korean Machine Reading Comprehension using SRU-based Sentence and Self Matching Networks", ETRI Journal, 2017, 3 pages.

Park et al. "VS3-NET: Neural variational inference model for machine-reading comprehension", ETRI Journal, Feb. 2019, 11 pages.

Park et al. "S2-Net: Machine reading comprehension with SRU-based self-matching networks", ETRI Journal, Dec. 2018, 12 pages.

* cited by examiner

11

START

PREPROCESS INPUT SENTENCE ～1100

PERFORM ENCODING ON
INPUT SEQUENCE ～1200

INPUT ENCODING RESULT TO
EACH OF FIRST DISCRIMINATOR
AND SECOND DISCRIMINATOR ～1300

FIRST DISCRIMINATOR OUTPUTS
POS TAGGING RESULT ～1400

SECOND DISCRIMINATOR OUTPUTS
SPACING RESULT ～1500

CALCULATE LOSS VALUE ～1600

ADJUST PARAMETERS ～1700

END

| INPUT SENTENCE | POS TAGGING | SPACING |
|---|---|---|
| nam | B-VV | B |
| eun | B-ETM | E |
| gi | B-NNG | B |
| reum | I-NNG | I |
| eu | B-JKB | I |
| ro | I-JKB | E |
| eol | B-MAG | B |
| ma | I-MAG | I |
| na | I-MAG | E |
| deo | B-MAG | B |
| gal | B-VV | B |
| su | B-EC | B |
| it | B-VX | B |
| eul | B-EC | I |
| kka | I-EC | E |

FIG. 13

| INDEX | POS TAG |
|:---:|:---:|
| 0 | B-VV |
| 1 | B-ETM |
| 2 | B-NNG |
| 3 | I-NNG |
| 4 | B-JKB |
| 5 | I-JKB |
| 6 | B-MAG |
| 7 | I-MAG |
| 8 | B-EC |
| 9 | B-VX |
| 10 | I-EC |

FIG. 14

| INDEX | SPACING |
|-------|---------|
| 0 | B |
| 1 | I |
| 2 | E |

FIG. 15

| INPUT SENTENCE | nam | eun | gi | reum | eu | ro | eol | ma | na | deo | gal | su | it | eul | kka |
|---|---|---|---|---|---|---|---|---|---|---|---|---|---|---|---|
| POS TAGGING | B-VV | B-ETM | B-NNG | I-NNG | B-JKB | I-JKB | B-MAG | I-MAG | I-MAG | B-MAG | B-VV | B-EC | B-VX | B-EC | I-EC |
| POS TAGGING INDEX | 0 | 1 | 2 | 3 | 4 | 5 | 6 | 7 | 7 | 8 | 0 | 8 | 9 | 8 | 10 |
| SPACING | B | E | B | I | I | E | B | I | E | B | B | B | B | I | E |
| SPACING INDEX | 0 | 2 | 0 | 1 | 1 | 2 | 0 | 1 | 2 | 0 | 0 | 0 | 0 | 1 | 2 |

FIG. 16

POS TAGGING SYSTEM (200)

NATURAL LANGUAGE
PROCESSING SYSTEM(300)

METHOD OF TRAINING POS TAGGING MODEL, COMPUTER-READABLE RECORDING MEDIUM AND POS TAGGING METHOD

CROSS-REFERENCE TO RELATED APPLICATION

This application claims under 35 U.S.C. § 119 the benefit of Korean Patent Application No. 10-2022-0094262, filed on Jul. 28, 2022 in the Korean Intellectual Property Office, the entire contents of which are incorporated herein by reference.

BACKGROUND

1. Field

The disclosure relates to a method of training a part-of-speech (POS) tagging model used for POS tagging on constituents of an input sentence, a computer-readable recording medium storing the training method, and a POS tagging method using the POS tagging model.

2. Description of the Background

Natural language processing technology is essential for providing services such as identifying what is intended by a user through dialogues with the user, finding an answer to a user's question from among numerous sentences, and the like.

Natural languages refer to any language used in people's daily lives for communication, in contrast to an artificial language or constructed language such as a computer programming language.

In order to analyze an input sentence consisting of such natural languages and identify the meaning of the input sentence, required are morpheme analysis and part-of-speech (POS) tagging processes of dividing the input sentence into small units such as morphemes and tagging POS information to each unit.

Meanwhile, when the input sentence includes a spacing error, effectiveness of morpheme analysis and POS tagging may decrease, causing deterioration of performances of subsequent tasks due to error propagation.

SUMMARY

Various examples of the disclosure provide a method of training a part-of-speech (POS) tagging model that may output morpheme analysis and POS tagging results which are robust to a spacing error, by training morpheme analysis and POS tagging together with a boundary of spacing, a computer-readable recording medium storing a program for implementing the method of training the POS tagging model, and a POS tagging method using the POS tagging model.

The technical objectives of the disclosure are not limited to the above, and other objectives may become apparent to those of ordinary skill in the art based on the following descriptions.

According to one or more example embodiments, a method may include: separating an input sentence into units of syllables to generate an input sequence; encoding, using at least one encoder included in a part-of-speech (POS) tagging model, the input sequence; generating, based on the encoded input sequence and using a first discriminator included in the POS tagging model, a POS tagging result; and generating, based on the encoded input sequence and using a second discriminator included in the POS tagging model, a spacing result.

The method may further include: calculating a first loss value on the POS tagging result; and calculating a second loss value on the spacing result.

The method may further include: calculating a total loss value by summing the first loss value and the second loss value; and adjusting parameters of the POS tagging model based on the total loss value.

Encoding the input sequence may include: performing global encoding by inputting the input sequence to a first encoder; and performing encoding based on a word order by inputting an output of the first encoder to a second encoder.

The first encoder may include a pre-trained language model.

The second encoder may include a bidirectional simple recurrent unit (SRU).

The first discriminator may include a conditional random field (CRF) layer.

The second discriminator may include a conditional random field (CRF) layer.

According to one or more embodiments, an apparatus may include: one or more processors; and memory storing instructions that, when executed by the one or more processors, cause the apparatus to: separate an input sentence into units of syllables to generate an input sequence; encode, using at least one encoder included in a part-of-speech (POS) tagging model, the input sequence; generate, based on the encoded input sequence and using a first discriminator included in the POS tagging model, a POS tagging result; and generate, based on the encoded input sequence and using a second discriminator included in the POS tagging model, a spacing result.

To encode the input sequence, the instructions, when executed by the one or more processors, may cause the apparatus to: perform global encoding by inputting the input sequence to a first encoder; and perform encoding based on a word order by inputting an output of the first encoder to a second encoder.

The first encoder may include a pre-trained language model.

The second encoder may include a bidirectional simple recurrent unit (SRU).

The first discriminator may include a conditional random field (CRF) layer.

The second discriminator may include a conditional random field (CRF) layer.

According to one or more embodiments, a non-transitory computer-readable medium may store instructions that, when executed by one or more processors, cause: separating an input sentence into units of syllables to generate an input sequence; encoding, using at least one encoder included in a part-of-speech (POS) tagging model, the input sequence; generating, based on the encoded input sequence and using a first discriminator included in the POS tagging model, a POS tagging result; and generating, based on the encoded input sequence and using a second discriminator included in the POS tagging model, a spacing result.

The instructions, when executed by the one or more processors, may further cause: calculating a first loss value on the POS tagging result; and calculating a second loss value on the spacing result.

The instructions, when executed by the one or more processors, may further cause: calculating a total loss value by summing the first loss value and the second loss value; and adjusting parameters of the POS tagging model based on the total loss value.

To encode the input sequence, the instructions, when executed by the one or more processors, may cause: performing global encoding by inputting the input sequence to a first encoder; and performing encoding based on a word order by inputting an output of the first encoder to a second encoder.

The first encoder may include a pre-trained language model. The second encoder may include a bidirectional simple recurrent unit (SRU).

Each of the first discriminator and the second discriminator may include a conditional random field (CRF) layer.

These and other features and advantages are described in greater detail below.

BRIEF DESCRIPTION OF THE DRAWINGS

These and/or other aspects of the disclosure will become apparent and more readily appreciated from the following description, taken in conjunction with the accompanying drawings of which:

FIG. 13 is a table illustrating an example of an output of a POS tagging model trained by a training apparatus and a training method according to an embodiment;

FIG. 14 is a table illustrating an example of indexes of POS tagging used in a training apparatus and a training method according to an embodiment;

FIG. 15 is a table illustrating an example of indexes of spacing boundary used in a training apparatus and a training method according to an embodiment;

FIG. 16 is a table illustrating an output result using indexes of FIGS. 14 and 15;

DETAILED DESCRIPTION

Figure 1:
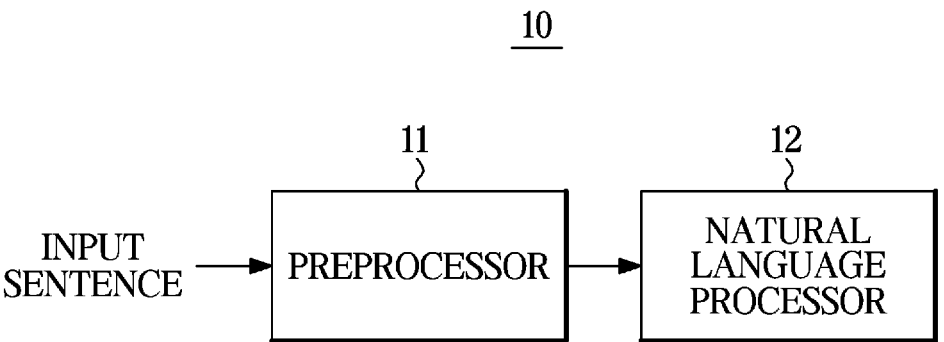
FIGS. 1 and 2 are block diagrams illustrating operations of a natural language processing system.

Various examples described in the specification and configurations shown in the accompanying drawings are exemplary, and various modifications may replace one or more examples, features, and the drawings of the present disclosure at the time of filing of the present application.

Terms used herein are for the purpose of describing particular embodiments only and is not intended to limit the disclosure. The singular form is intended to include the plural form as well, unless the context clearly indicates otherwise.

It should be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

Further, the terms such as "~part", "~device", "~block", "~member", "~module", and the like may refer to a unit for processing at least one function or act. For example, the terms may refer to at least process processed by at least one hardware, such as field-programmable gate array (FPGA)/ application specific integrated circuit (ASIC), software stored in memories or processors.

It will be understood that, although the terms first, second, etc. may be used herein to describe various elements, these elements should not be limited by these terms.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it should be understood that the term "at least one of a, b, or c" may include only a, only b, only c, both a and b, both a and c, both b and c, or all of a, b and c.

Hereinafter, embodiments of the disclosure are described in detail with reference to the accompanying drawings.

Figure 2:
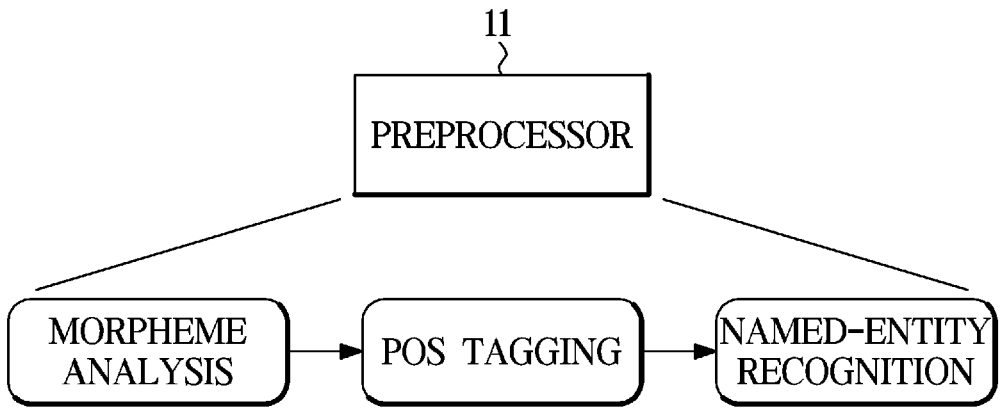

FIGS. 1 and 2 are block diagrams illustrating operations of a natural language processing system.

A natural language processing system 10 processes and understands a natural language input by a user to identify what is intended by the user and provide a service corresponding to the user intention. For example, the natural language processing system 10 may be used for implementing a search system, a question-and-answer system, a content providing system using speech recognition, or a device control system using speech recognition, and the like.

An input sentence processed by the natural language processing system 10 may be a text converted from a user's speech, or a text input by a user.

Referring to FIG. 1, an input sentence may be input to a preprocessor 11 and pre-processed, and a natural language processor 12 may perform a task such as intent classification, slot-filling, etc., on the input sentence.

Referring to FIG. 2, the preprocessor 11 may perform morpheme analysis, part-of-speech (POS) tagging, and named-entity recognition on the input sentence.

Specifically, the preprocessor 11 may separate the input sentence into units of morphemes, analyze the part-of-speech for each morpheme, and tag the part-of-speech for each morpheme. The preprocessor 11 may perform tokenization on the input sentence based on a result of morpheme analysis.

Named-entity recognition is one of information extraction tasks for finding a specific type of word in a sentence. For instance, when the natural language processing system 10 is used to implement a vehicle-related question-and-answer system, a device, which is a subject of question, for example, a vehicle-related word, may be detected in an input sentence through named-entity recognition.

The preprocessor 11 may perform labeling on an entity name, detected in the input sentence, using a B-I-O tag. For example, B may be assigned to a part at which a vehicle-related named entity begins, I may be assigned to a part belonging to a vehicle-related named entity, and O may be assigned to a part that is not a vehicle-related named entity.

The natural language processor 12 may perform processing such as a natural language understanding process, etc., based on a preprocessing result on the input sentence. Accordingly, when an error is included in the preprocessing result, a performance of natural language understanding following the preprocessing may be affected due to error propagation.

Meanwhile, a result of morpheme analysis and POS tagging may vary depending on a position of a boundary of spacing in the input sentence. Accordingly, when a spacing error is included in the input sentence, a performance of morpheme analysis and POS tagging is deteriorated, and thus the natural language processor 12 may output a result not matching a user's intention.

In particular, when a user utters a sentence, spacing is not usually reflected. Accordingly, in a dialogue system identifying a user intention through dialogues with the user, a spacing error may occur in a speech recognition process for converting a user's speech into text, leading to deterioration of performance of subsequent operations.

A POS tagging model trained by a training method and a training apparatus according to an embodiment may train POS tagging together with spacing, thereby outputting morpheme analysis and POS tagging results robust to a spacing error.

Figure 3:
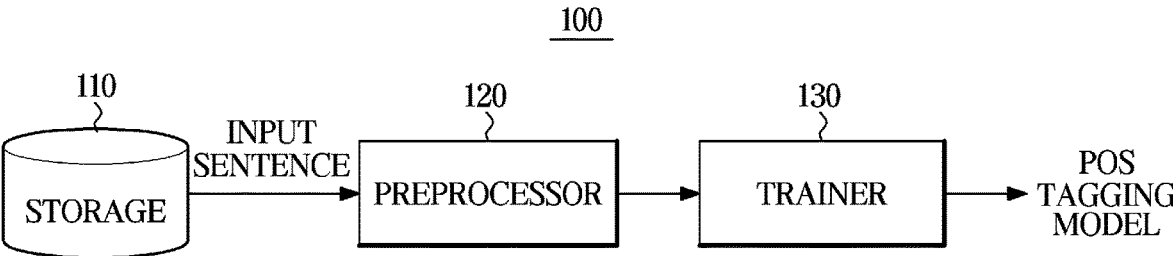
FIG. 3 is a block diagram illustrating operations of an apparatus for training a part-of-speech (POS) tagging model according to an embodiment.
Figure 4:
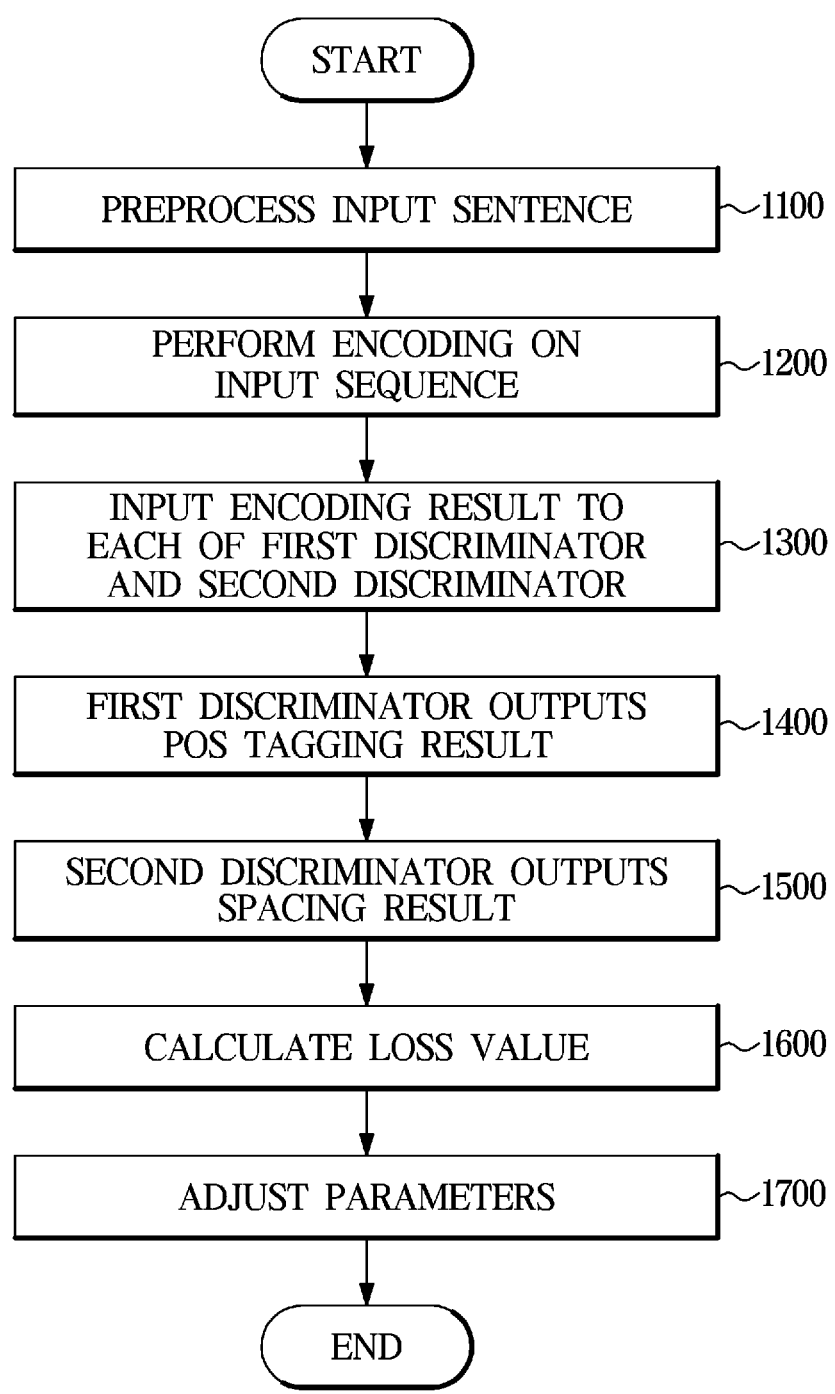
FIG. 4 is a flowchart illustrating a method of training a POS tagging model according to an embodiment.
Figure 5:
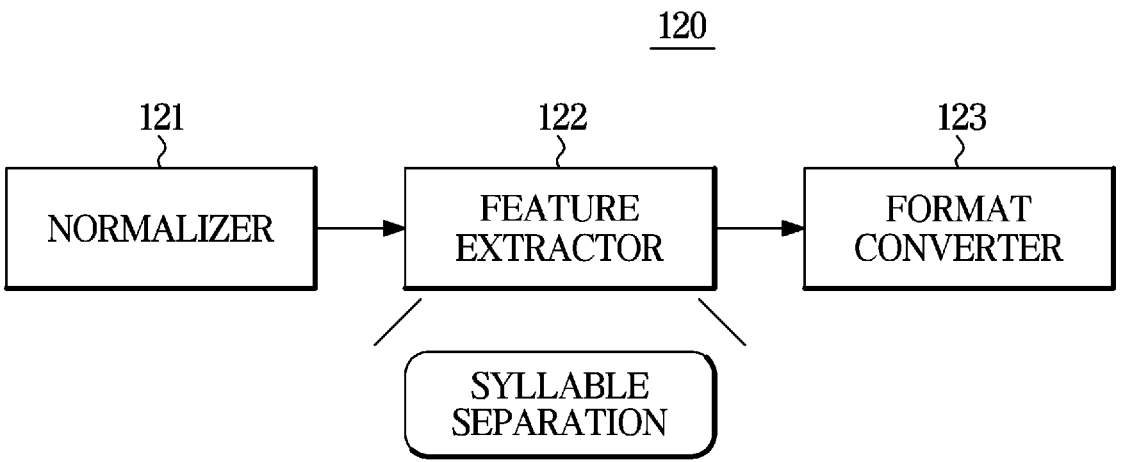
FIG. 5 is a block diagram illustrating preprocessing operations of an apparatus for training a POS tagging model according to an embodiment.
Figure 6:
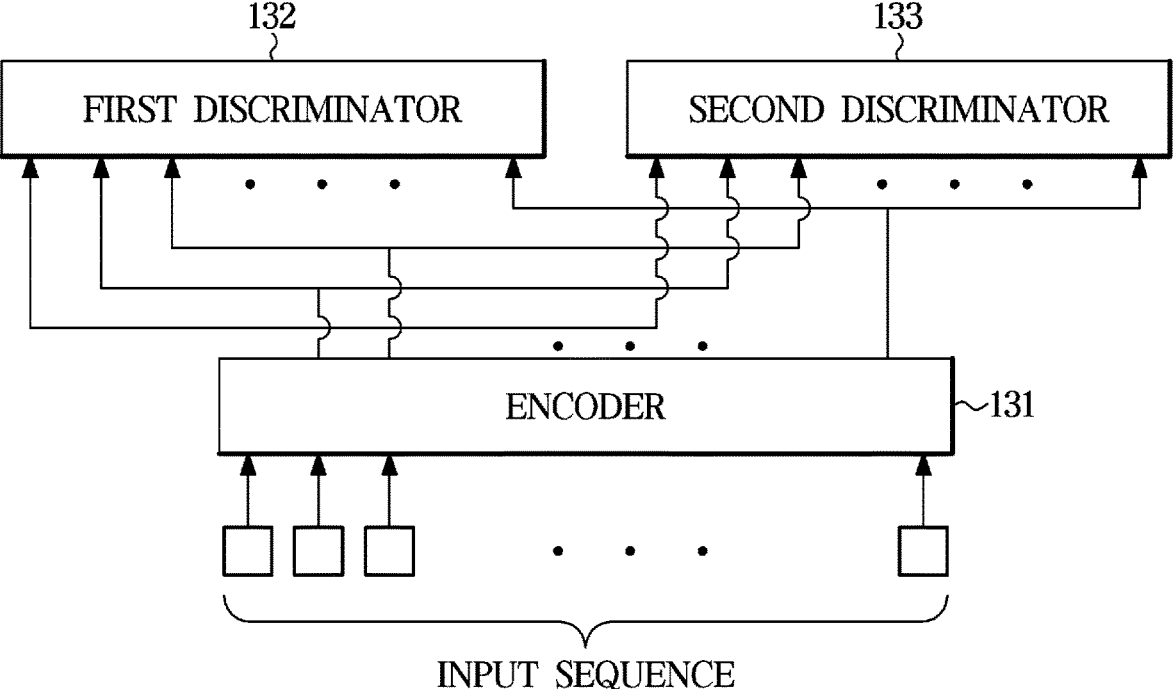
FIG. 6 is a diagram illustrating a network structure of a POS tagging model that performs training in an apparatus for training the POS tagging model according to an embodiment.

FIG. 3 is a block diagram illustrating operations of an apparatus for training a POS tagging model according to an embodiment. FIG. 4 is a flowchart illustrating a method of training a POS tagging model according to an embodiment. FIG. 5 is a block diagram illustrating preprocessing operations of an apparatus for training a POS tagging model according to an embodiment. FIG. 6 is a diagram illustrating a network structure of a POS tagging model that performs training in an apparatus for training the POS tagging model according to an embodiment.

A method of training a POS tagging model according to an embodiment may be implemented by an apparatus for training a POS tagging model. Accordingly, a description on the method of training a POS tagging model is applicable to the apparatus for training a POS tagging model, even when not specifically described below. A description on the apparatus for training a POS tagging model may also be applied to the method of training a POS tagging model, even when not specifically described below.

Referring to FIG. 3, an apparatus for training a POS tagging model 100 (hereinafter, training apparatus) may include a storage 110, a preprocessor 120 and a trainer 130.

The storage 110 may store training data used for training a POS tagging model. The training data may include input sentences used as an input of the POS tagging model, and results (ground truth) of POS tagging and spacing on each of the input sentences. The input sentences may include sentences without a spacing between words.

The POS tagging model trained according to the training method and the training apparatus 100 according to an embodiment may be a deep learning model having an input layer, an output layer, and a plurality of hidden layers.

The preprocessor 120 may convert the input sentence into a format that may be processed by the deep learning model, before the input sentence is input to the trainer 130.

A network structure of the POS tagging model may be stored in the trainer 130, and the POS tagging model may simultaneously learn POS tagging and spacing on the input sentence using the training data.

The training apparatus 100 may be a computing device including at least one memory and at least one processor. For example, the processor may include a central processing unit (CPU), a graphic processing unit (GPU), or a combination of CPU and GPU. The memory may include a dynamic random access memory (DRAM) or a high bandwidth memory (HBM).

The constituent components such as the preprocessor 120 and the trainer 130 are distinguished by an operation, not by physical configuration. Accordingly, the constituent components are not necessarily implemented with separate memories or processors, and at least a portion of constituent components may share a memory or processor.

Also, the storage 110 is not necessarily physically distinguished from the preprocessor 120 or the trainer 130, and may share a memory with the preprocessor 120 or the trainer 130.

Referring to FIG. 4, the method of training a POS tagging model (hereinafter, training method) according to an embodiment performs preprocessing on an input sentence (1100).

The preprocessing on the input sentence may be performed by the preprocessor 120 of the training apparatus 100. Referring to a configuration of the preprocessor 120 shown in FIG. 5 together, the preprocessor 120 may include a normalizer 121 normalizing the input sentence, a feature extractor 122 extracting a feature from the input sentence, and a format converter 123 converting a format of the input sentence.

The normalizer 121 may perform normalization to exclude meaningless data such as special characters, symbols, and the like, from the input sentence. It is assumed that all the input sentence processed by the constituent components to be described later is a normalized input sentence.

The feature extractor 122 may extract a feature from the normalized input sentence, and the format converter 123 may assign indexes to the input sentence based on the extracted feature. In the embodiment, the extracted feature may be a syllable. That is, the feature extractor 122 may separate the input sentence into units of syllables.

The format converter 123 may perform indexing on the input sentence based on the feature extraction result. Specifically, the format converter 123 may assign an index to each of a plurality of syllables constituting the input sentence by using a predefined dictionary. The index assigned in the format conversion process may indicate a position of a word in the dictionary.

In the below-described embodiment, the input sentence where preprocessing has been completed is referred to as an input sequence. The input sequence may be processed in units of token. In the embodiment, a token in units of syllable is used.

The input sequence may be input to the trainer 130 and be used for training of the POS tagging model.

Referring to FIG. 6, the POS tagging model trained in the trainer 130 may include an encoder 131 encoding the input sequence, a first discriminator 132 performing POS tagging on the input sequence based on an output of the encoder 131, and a second discriminator 133 discriminating a boundary of spacing on the input sequence based on an output of the encoder 131.

Referring again to FIG. 4, according to the training method, encoding is performed on the input sequence using the encoder 131 (1200).

The input sentence in which the preprocessing has been completed by the preprocessor 120 (e.g., the input sequence) may be input to the encoder 131, and the encoder 131 may encode the input sequence consisting of tokens in syllable units.

A result of encoding the input sequence is input to each of the first discriminator 132 and the second discriminator 133 (1300).

The encoding result on the input sequence may include each hidden state of the encoder 131. That is, a hidden state for each token constituting the input sequence, which has been encoded by the encoder 131, may be input to each of the first discriminator 132 and the second discriminator 133.

The first discriminator 132 outputs a POS tagging result for the input sequence (1400), and the second discriminator 133 outputs a spacing result for the input sequence (1500).

As described above, the encoding result on the input sequence may be input to each of the first discriminator 132 and the second discriminator 133. The first discriminator 132 may tag POS information for each syllable-unit token constituting the input sequence. The second discriminator 133 may discriminate a boundary of spacing for each syllable-unit token constituting the input sequence.

That is, the POS tagging model generated according to an embodiment of the disclosure may perform multi-task learning that learns POS tagging together with discrimination of boundary of spacing on the input sentence.

A loss value for a discrimination result is calculated (1600), and parameters of POS tagging model are adjusted based on the calculated loss value (1700).

The trainer 130 may calculate a first loss value on the POS tagging result for the input sequence (e.g., a discrimination result of the first discriminator 132), and also calculate a second loss value on the spacing result for the input sequence (e.g., a discrimination result of the second discriminator 133).

The trainer 130 may calculate the first loss value by inputting the POS tagging result for the input sequence and a ground truth, stored in the storage 110, to a loss function, and calculate the second loss value by inputting the spacing result for the input sequence and a ground truth, stored in the storage 110, to a loss function.

For example, a cross-entropy function may be used as the loss function used for calculating a loss value by the trainer 130.

The trainer 130 may calculate a total loss value by summing the first loss value and the second loss value. When summing the first loss value and the second loss value, a weight may be applied to each of the first loss value and the second loss value.

The trainer 130 may adjust a parameter of POS tagging model based on the calculated total loss value. The parameter of POS tagging model may include weight or bias of hidden layers constituting the POS tagging model.

Figure 7:
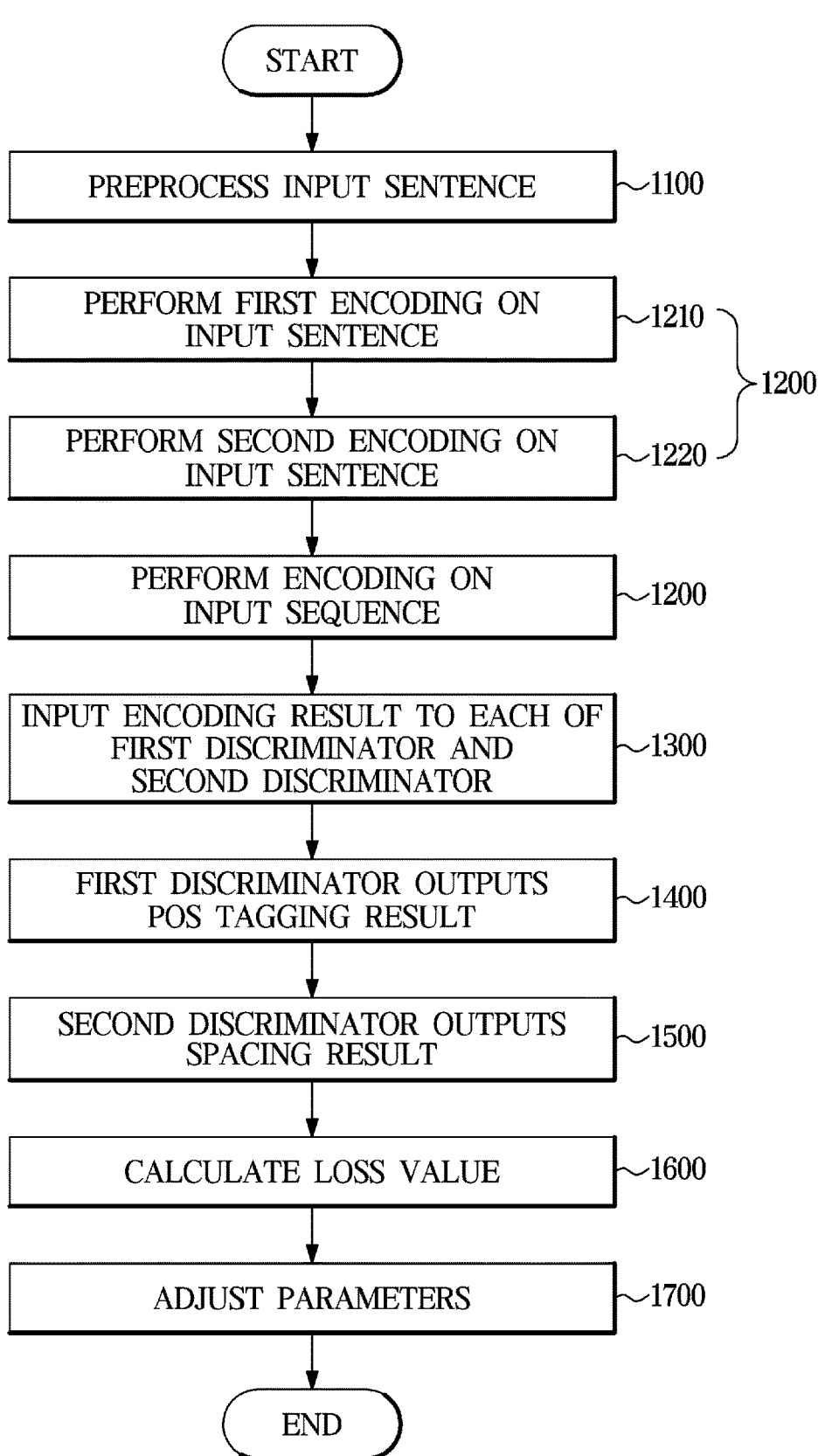
FIG. 7 is a flowchart illustrating detailed encoding processes in a method of training a POS tagging model according to an embodiment.
Figure 8:
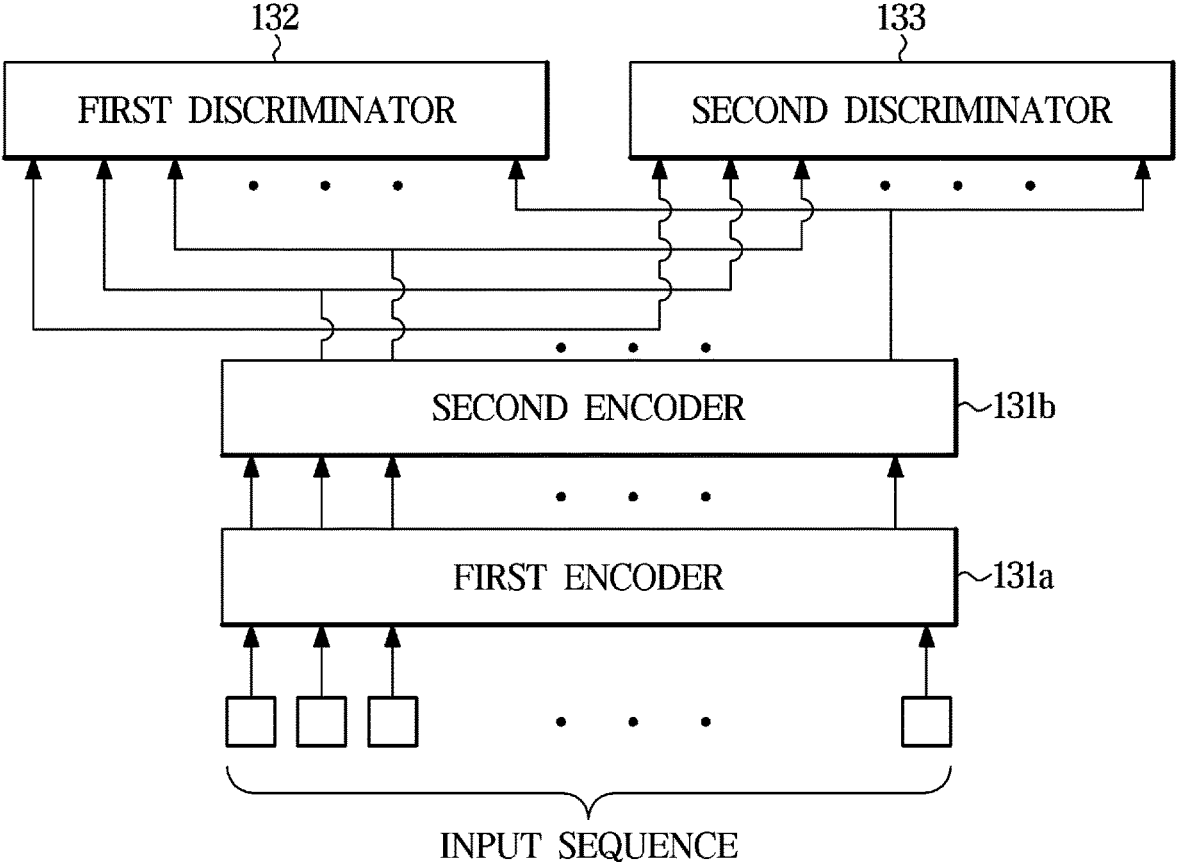
FIG. 8 is a diagram illustrating in greater detail a network structure of a POS tagging model that performs training in an apparatus for training the POS tagging model according to an embodiment.

FIG. 7 is a flowchart illustrating detailed encoding processes in a method of training a POS tagging model according to an embodiment. FIG. 8 is a diagram illustrating in greater detail a network structure of a POS tagging model that performs training in an apparatus for training the POS tagging model according to an embodiment.

Referring to FIGS. 7 and 8, when encoding the input sequence (1200), the training method according to an embodiment may perform two stages of encoding including a first encoding by a first encoder 131*a* (1210) and a second encoding by a second encoder 131*b* (1220).

The first encoder 131*a* may be implemented as a pre-trained language model (PLM). For example, the first encoder 131*a* may employ one of the PLMs such as efficiently learning an encoder that classifies token replacements accurately (ELECTRA), bidirectional encoder representations from transformers (BERT), generative pre-trained transformer (GPT), and the like.

The first encoder 131*a* performs attention-based encoding on the entire sentence using the PLM based on a large corpus, thereby converting each token constituting the input sequence into a vector that accurately represents its meaning. Accordingly, a performance of POS tagging and spacing following the encoding may be improved.

The second encoder 131*b* may be implemented as a recurrent neural network (RNN). For example, the second encoder 131*b* is implemented as a bidirectional simple recurrent units++ (SRU++) that enables faster calculation and more effective abstraction, to sequentially encode hidden states. Through sequential encoding of context information, a performance of the POS tagging model may be improved.

That is, context information for the entire sentence may be generated by using the first encoder 131*a*, and context information based on a word order may be generated by using the second encoder 131*b*, and thus a performance improvement may be enhanced by using the generated context information.

Hereinafter, a training process of the POS tagging model according to an embodiment is described in greater detail using an example of an input sentence.

Figure 9:
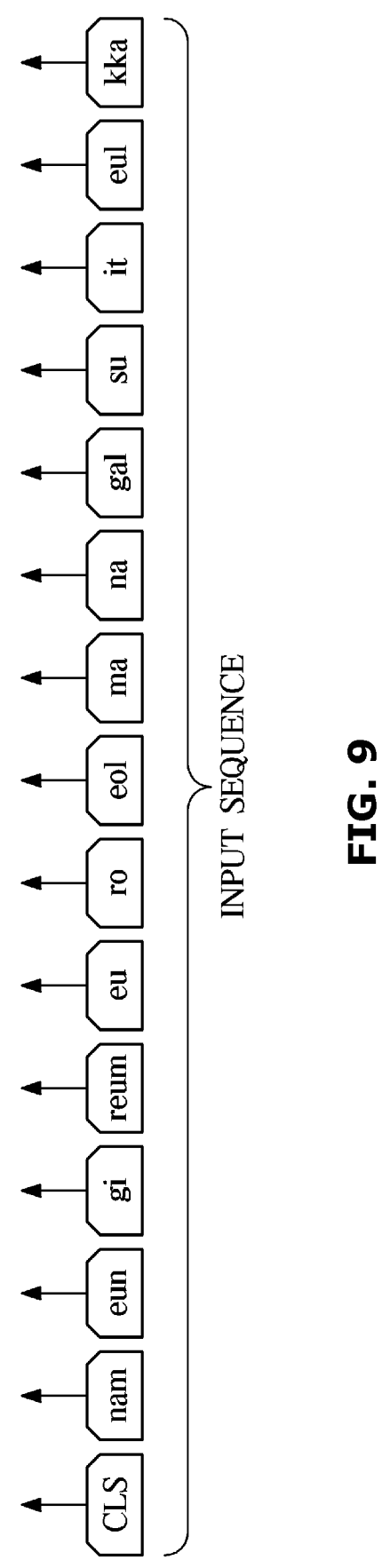
FIG. 9 is a diagram illustrating an example of an input sequence generated by preprocessing an input sentence.
Figure 10:
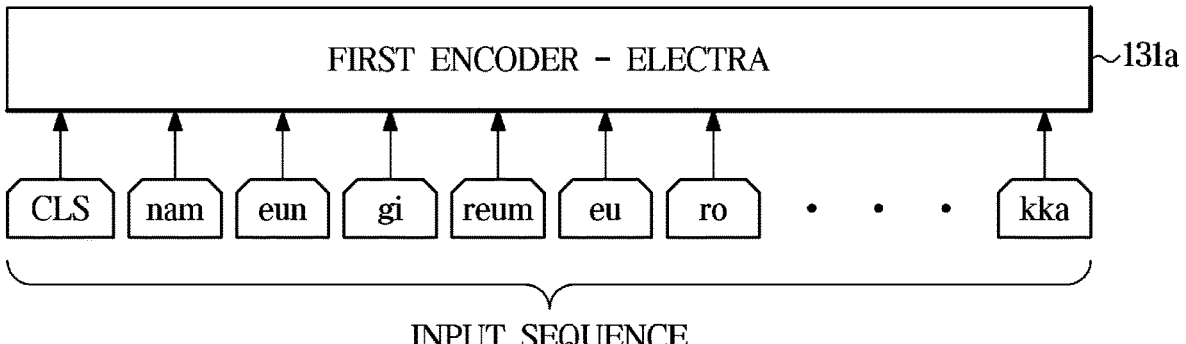
FIG. 10 is a diagram illustrating an example of an input to a first encoder of a POS tagging model trained according to an embodiment.
Figure 11:
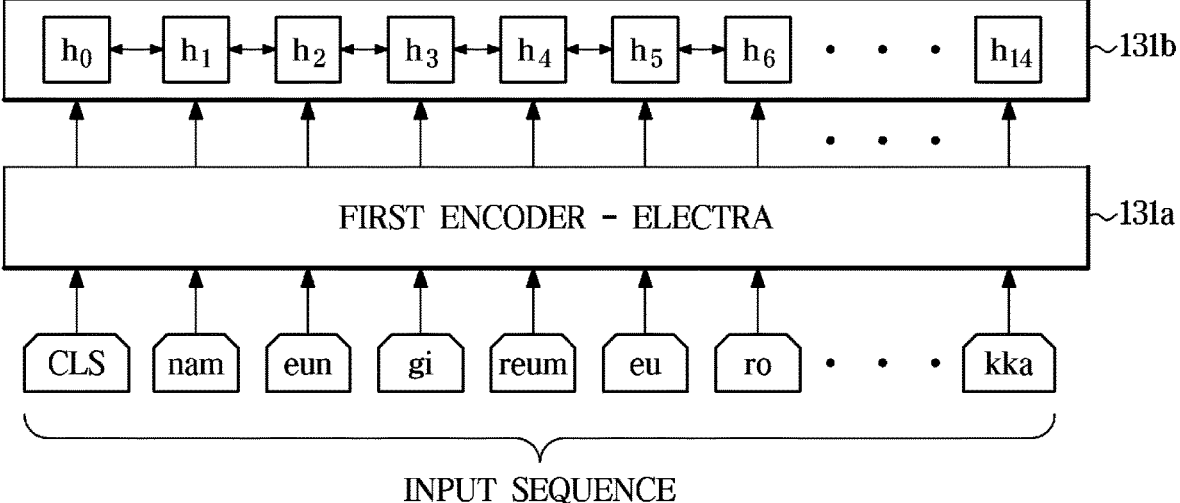
FIG. 11 is a diagram illustrating an example of an input to a second encoder of a POS tagging model trained according to an embodiment.
Figure 12:
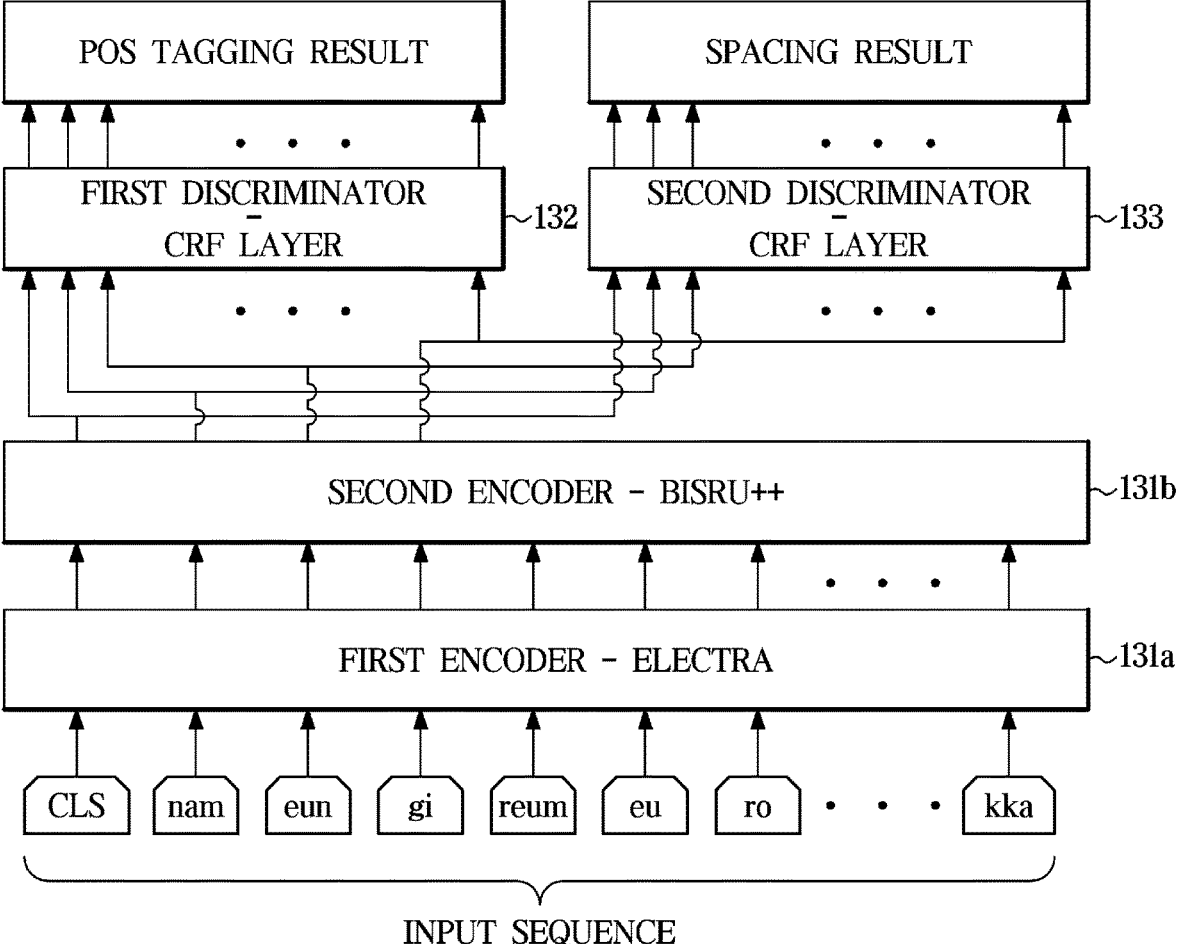
FIG. 12 is a diagram illustrating an example of outputs of discriminators of a POS tagging model trained according to an embodiment.

FIG. 9 is a diagram illustrating an example of an input sequence generated by preprocessing an input sentence. FIG. 10 is a diagram illustrating an example of an input to a first encoder of a POS tagging model trained according to an embodiment. FIG. 11 is a diagram illustrating an example of an input to a second encoder of a POS tagging model trained according to an embodiment. FIG. 12 is a diagram illustrating an example of outputs of discriminators of a POS tagging model trained according to an embodiment.

In the below-described embodiment, an example where an input sentence, "nameungireumeuroeolmanagalsuiteulkka" ("How far can my car travel with remaining fuel?" in Korean), from among training data stored in the storage 110 is used for training is described.

When the input sentence, "nameungireumeuroeolmanagalsuiteulkka", is input to the preprocessor 120, the preprocessor 120 may separate the input sentence into units of syllables, thereby generating an input sequence including tokens in units of syllable, "nam", "eun", "gi", "reum", "eu", "ro", "eol", "ma", "na", "gal", "su", "it", "eul", "kka", as shown in FIG. 9.

The plurality of tokens constituting the input sequence may include a [CLS] token which is located at a beginning of sentence. Through an encoding process described below, a vector for the [CLS] token may imply a meaning of the input sentence.

As shown in FIG. 10, the input sequence may be input to the first encoder 131a. As one of the above examples, the first encoder 131a may be implemented as ELECTRA which is the pre-trained language model (PLM). In a hidden state encoded by the first encoder 131a, context information for a large corpus has been previously trained, and thus encoding performance may be improved.

The first encoder 131a may perform global encoding on the entire sentence, and as shown in FIG. 11, a plurality of hidden states encoded in the first encoder 131a may be used as an input of the second encoder 131b.

As one of the above examples, the second encoder 131b may be implemented as bidirectional SRU++, and perform encoding based on a word order. In general SRU models, a vanishing gradient problem in which information about previous input is lost as encoding is performed may occur. In the embodiment, the second encoder 131b implemented as bidirectional SRU++ may generate new hidden states $h_0$-$h_{14}$ by encoding input vectors bidirectionally (e.g., forward and backward).

Referring to FIG. 12, a hidden state for each token (e.g., an output of the second encoder 131b) is input to both the first discriminator 132 and the second discriminator 133. That is, the first discriminator 132 and the second discriminator 133 may share the input.

Both the first discriminator 132 and the second discriminator 133 may include a conditional random field (CRF) layer.

The CRF layer of the first discriminator 132 may output POS information matching each token constituting the input sequence, as a probability value (for example, a probability value that a corresponding token matches a noun, a probability value that a corresponding token matches a verb, etc.). Also, the first discriminator 132 may discriminate a POS that matches each token, based on the probability value output from the CRF layer. For example, a POS having a largest probability value may be determined as a POS matching the corresponding token.

The CRF layer of the second discriminator 133 may output a probability value that each token constituting the input sequence corresponds to a boundary of spacing, and the second discriminator 133 may discriminate whether each token corresponds to a boundary of spacing, based on the probability value output from the CRF layer.

FIG. 13 is a table illustrating an example of an output of a POS tagging model trained by a training apparatus and a training method according to an embodiment.

When the above input sentence, "nameungireumeuroeolmanagalsuiteulkka" ("How far can my car travel with remaining fuel?" in Korean), is input to a POS tagging model trained by the training apparatus and the training method according to an embodiment, a POS tagging and spacing result may be obtained as shown in FIG. 13.

Specifically, the first discriminator 132 may output a morpheme analysis result using B-I tag. In the B-I tag, B indicates a beginning of a morpheme, and I indicates continuation of a morpheme.

For reference, in the morpheme analysis result of the embodiment, VV indicates a verb, ETM indicates a prenominal transformative ending, NNG indicates a general noun, JKB indicates an adverbial case postposition, MAG indicates a general adverb, EC indicates a connective ending, and VX indicates an auxiliary predicate element.

The second discriminator 132 may output a spacing result using B-I-E tag. In the B-I-E tag, B indicates a beginning of a phrase, I indicates continuation of phrase, and E indicates an ending of phrase. Although the example POS tagging and spacing results shown in FIG. 13 are generated based on grammar and syntactic rules of the Korean language, rules related to other languages may be applied instead to produce results appropriate for a given language being used.

FIG. 14 is a table illustrating an example of indexes of POS tagging used in a training apparatus and a training method according to an embodiment. FIG. 15 is a table illustrating an example of indexes of spacing boundary used in a training apparatus and a training method according to an embodiment. FIG. 16 is a table illustrating an output result using indexes of FIGS. 14 and 15.

As shown in FIG. 14, matching between B-I tag and POS tag may be represented as index expressed in numbers.

Also, as shown in FIG. 15, B-I-E tag may be represented as index expressed in numbers.

The first discriminator 132 may output a POS tagging result using the index shown in FIG. 14, and the second discriminator 133 may output a spacing result using the index shown in FIG. 15. The output result may be represented by the table of FIG. 16.

Hereinafter, an apparatus and method using the POS tagging model trained according to the above-described embodiment is described.

Figure 17:
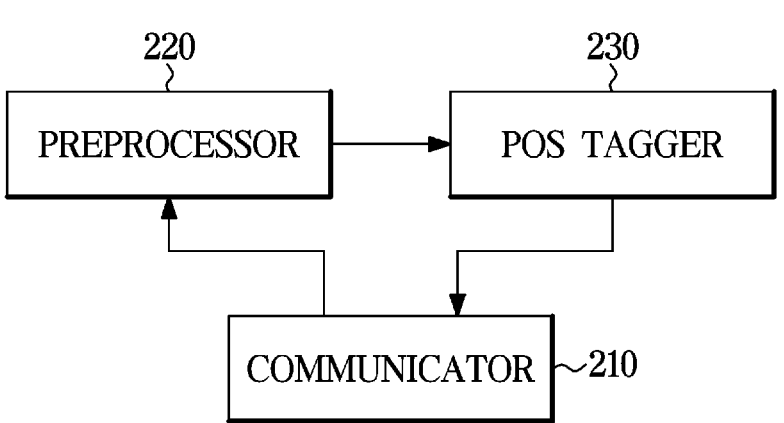
FIG. 17 is a block diagram illustrating operations of a POS tagging system according to an embodiment.

FIG. 17 is a block diagram illustrating operations of a POS tagging system according to an embodiment.

Referring to FIG. 17, a POS tagging system 200 according to an embodiment may include a communicator 210 receiving an input sentence from an external device, a preprocessor 220 preprocessing the received input sentence, and a POS tagger 230 performing POS tagging on the preprocessed POS tagging.

The communicator module 210 may receive an input sentence from a device that performs natural language processing on a user's input sentence, like a search system, a question-and-answer system, a speech recognition system, or a dialogue system.

The received input sentence may be text converted by applying a speech recognition technology to a user's speech, or text directly input from a user.

The communicator module 210 may wirelessly communicate with a base station or an access point (AP), and exchange data with external devices through a base station or an access point.

For example, the communicator module 210 may wirelessly communicate with an access point using Wi-Fi (e.g., Wi-Fi, IEEE 802.11 standard), or communicate with a base station using a code division multiple access (CDMA), wideband CDMA (WCDMA), global system for mobile communication (GSM), long term evolution (LTE), 5G, Wibro, and the like.

The preprocessor 220 may convert the input sentence into a format that may be processed by the POS tagging model which is a deep learning model, before the input sentence is input to the POS tagging model.

For example, the preprocessor 220 may perform normalization to exclude meaningless data such as special characters, symbols, and the like, from the input sentence. Also, the preprocessor 220 may extract a feature from the normalized input sentence and assign indexes to the input sentence based on the extracted feature. In the embodiment, the extracted feature may be a syllable. That is, the preprocessor 220 may separate the input sentence into units of syllables.

In addition, the preprocessor 220 may perform indexing on the input sentence based on the feature extraction result. Specifically, the preprocessor 220 may assign an index to each of a plurality of syllables constituting the input sentence by using a predefined dictionary. The index assigned in the format conversion process may indicate a position of a word in the dictionary.

The input sentence where preprocessing has been completed is referred to as an input sequence. The input sequence may be processed in units of token. In the embodiment, a token in units of syllable is used.

The POS tagger 230 may perform POS tagging on the input sequence using the POS tagging model trained according to the above-described embodiment. To this end, the POS tagging model trained according to the above-described embodiment may be stored in the POS tagger 230.

The POS tagger 230 may include an encoder encoding the input sequence, a first discriminator performing POS tagging on the input sequence based on an output of the encoder, and a second discriminator discriminating a boundary of spacing on the input sequence based on an output of the encoder.

Also, the encoder may include a first encoder that performs a first encoding on the input sequence, and a second encoder that performs a second encoding on the input sequence. The first encoding may be global encoding on the entire sentence, and a plurality of hidden states encoded in the first encoder may be used as an input of the second encoder. The second encoding may be encoding sequential context information.

The first encoder may be implemented as a pre-trained language model (PLM). For example, the first encoder may employ one of the PLMs such as efficiently learning an encoder that classifies token replacements accurately (ELECTRA), bidirectional encoder representations from transformers (BERT), generative pre-trained transformer (GPT), and the like.

The second encoder may be implemented as a recurrent neural network (RNN). For example, the second encoder is implemented as a bidirectional simple recurrent units++ (SRU++) that enables faster calculation and more effective abstraction, to sequentially encode hidden states.

A hidden state for each token (e.g., an output of the second encoder) is input to both the first discriminator and the second discriminator. That is, the first discriminator and the second discriminator may share the input.

Both the first discriminator and the second discriminator may include a conditional random field (CRF) layer.

The CRF layer of the first discriminator may output POS information matching each token constituting the input sequence, as a probability value (for example, a probability value that a corresponding token matches a noun, a probability value that a corresponding token matches a verb, etc.). Also, the first discriminator may discriminate a POS that matches each token, based on the probability value output from the CRF layer. For example, a POS having a largest probability value may be determined as a POS matching the corresponding token.

The CRF layer of the second discriminator may output a probability value that each token constituting the input sequence corresponds to a boundary of spacing, and the second discriminator may discriminate whether each token corresponds to a boundary of spacing, based on the probability value output from the CRF layer.

The communicator 210 may transmit, to a system transmitting the input sentence, the POS tagging result or the POS tagging and spacing result output from the POS tagger 230.

The POS tagging system 200 may include at least one memory storing a program performing the aforementioned operations or operations to be described later and at least one processor implementing a stored program.

The POS tagging system 200 may be a computing device such as a server including at least one memory and at least one processor.

The constituent components such as the preprocessor 220 and the POS tagger 230 are distinguished by an operation, not by physical configuration. Accordingly, the constituent components are not necessarily implemented with separate memories or processors, and at least a portion of constituent components may share a memory or processor.

Figure 18:
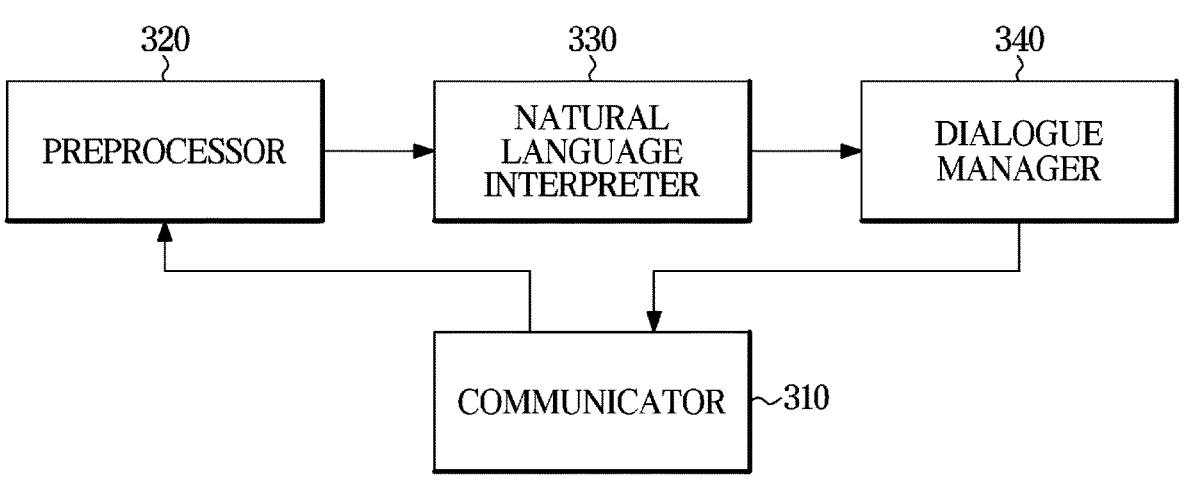
FIG. 18 is a block diagram illustrating operations of a natural language processing system according to an embodiment.

FIG. 18 is a block diagram illustrating operations of a natural language processing system according to an embodiment.

Referring to FIG. 18, a natural language processing system 300 according to an embodiment may include a communicator 310, a preprocessor 320, a natural language interpreter 330, and a dialogue manager 340. Here, the communicator 310 receives information about an input sentence from an external device such as a user terminal, the preprocessor 320 preprocesses the received input sentence, the natural language interpreter 330 performs a task such as intent classification, slot-filling, etc., by applying a natural language understanding technology to the preprocessed input sentence, and the dialogue manager 340 generates a system response based on a result of natural language understanding on the input sentence.

The information about the input sentence received by the communicator 310 may be a voice signal uttered by a user, text converted by applying a speech recognition technology to a user's speech, or text directly input from a user.

When a voice signal is received from an external device, a speech recognition module may be further included in the natural language processing system 300, and the speech recognition module may convert the voice signal into text by applying a speech recognition technology to the received voice signal.

The communicator 310 may wirelessly communicate with a base station or an access point (AP), and exchange data with external devices through a base station or an access point.

For example, the communicator 310 may wirelessly communicate with an access point using Wi-Fi (e.g., Wi-Fi, IEEE 802.11 standard), or communicate with a base station using a CDMA, WCDMA, GSM, LTE, 5G, Wibro, and the like.

The preprocessor 320 may perform a task such as morpheme analysis or POS tagging on the input sentence. To this end, the POS tagging model trained according to the above-described embodiment may be stored in the preprocessor 320.

Specifically, the preprocessor 320 may perform normalization to exclude meaningless data such as special characters, symbols, and the like, from the input sentence, and also perform tokenization by separating the normalized input sentence into units of syllables. The input sentence tokenized in units of syllable is referred to as an input sequence.

The preprocessor 320 may perform POS tagging on the input sequence using the POS tagging model trained according to the above-described embodiment. Accordingly, the preprocessor 320 may include an encoder encoding the input sequence, a first discriminator performing POS tagging on the input sequence based on an output of the encoder, and a second discriminator discriminating a boundary of spacing based on an output of the encoder.

Also, the encoder may include a first encoder that performs a first encoding on the input sequence, and a second encoder that performs a second encoding on the input sequence. The first encoding may be global encoding on the entire sentence, and a plurality of hidden states encoded in the first encoder may be used as an input of the second encoder. The second encoding may be encoding sequential context information.

The first encoder may be implemented as a pre-trained language model (PLM). For example, the first encoder may employ one of the PLMs such as efficiently learning an encoder that classifies token replacements accurately (ELECTRA), bidirectional encoder representations from transformers (BERT), generative pre-trained transformer (GPT), and the like.

The second encoder may be implemented as a recurrent neural network (RNN). For example, the second encoder is implemented as a bidirectional simple recurrent units++ (SRU++) that enables faster calculation and more effective abstraction, to sequentially encode hidden states.

A hidden state for each token (e.g., an output of the second encoder) is input to both the first discriminator and the second discriminator. That is, the first discriminator and the second discriminator may share the input.

Both the first discriminator and the second discriminator may include a conditional random field (CRF) layer.

The CRF layer of the first discriminator may output POS information matching each token constituting the input sequence, as a probability value (for example, a probability value that a corresponding token matches a noun, a probability value that a corresponding token matches a verb, etc.). Also, the first discriminator may discriminate a POS that matches each token, based on the probability value output from the CRF layer. For example, a POS having a largest probability value may be determined as a POS matching the corresponding token.

The CRF layer of the second discriminator may output a probability value that each token constituting the input sequence corresponds to a boundary of spacing, and the second discriminator may discriminate whether each token corresponds to a boundary of spacing, based on the probability value output from the CRF layer.

A POS tagging result of the preprocessor 320 may be input to the natural language interpreter 330, together with the input sequence.

The natural language interpreter 330 may classify an intent corresponding to the input sequence based on the POS tagging result, and extract a slot related to the intent corresponding to the input sequence.

The dialogue manager 340 may generate an appropriate system response based on the intent classification result and slot extraction result, and the communicator 310 may transmit the generated system response to a user terminal.

Figure 19:
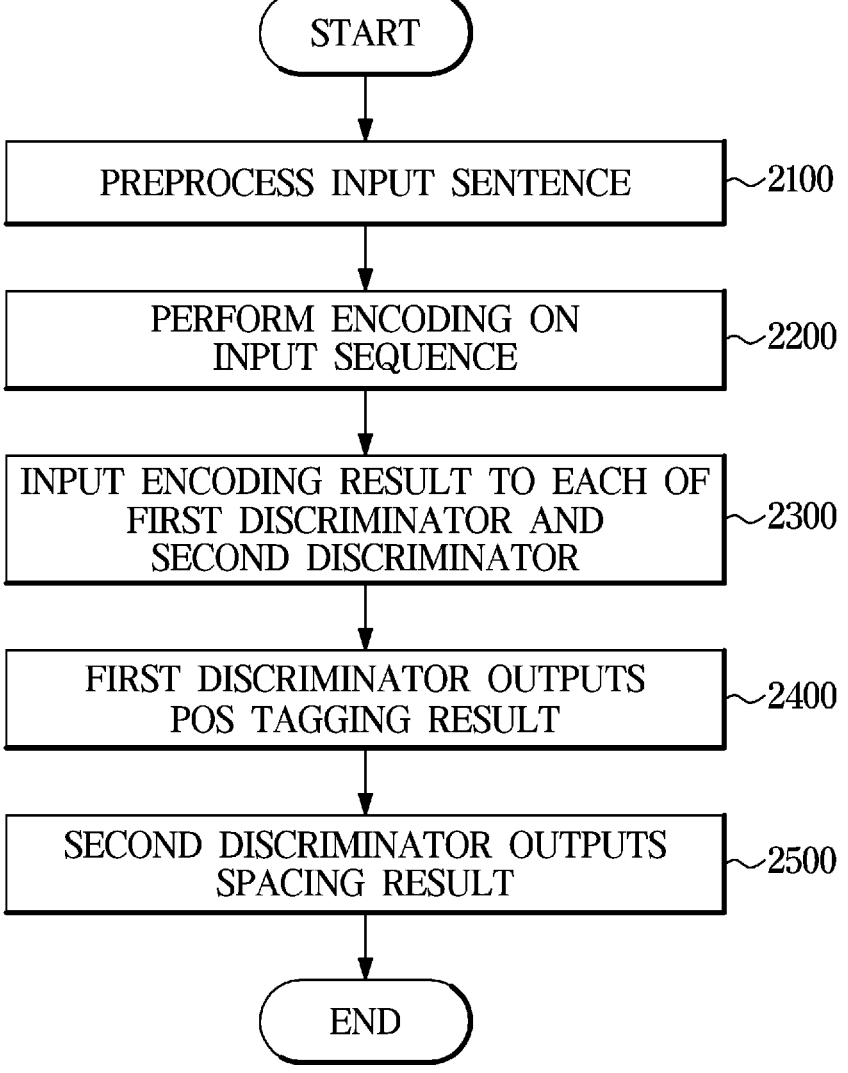
FIG. 19 is a flowchart illustrating a POS tagging method using a POS tagging model trained according to an embodiment.

FIG. 19 is a flowchart illustrating a POS tagging method using a POS tagging model trained according to an embodiment.

A POS tagging method according to an embodiment may be performed by the POS tagging system 200 according to the above embodiment or the preprocessor 320 of the natural language processing system 300. Accordingly, the POS tagging model trained according to the above embodiment may be used when performing the POS tagging method according to an embodiment, and thus the above description related to POS tagging may be applied to embodiments of the POS tagging method, even when not specifically described below.

Referring to FIG. 19, in the POS tagging method according to an embodiment, preprocessing is first performed on an input sentence (2100).

The preprocessing on the input sentence may be performed in the preprocessor 220 of the POS tagging system 200 or the preprocessor 320 of the natural language processing system 300. Specifically, the input sentence may be normalized, the normalized input sentence may be separated into units of syllables, and indexes may be assigned to each of a plurality of syllables constituting the input sentence.

When the preprocessing is completed, an input sequence including a plurality of syllable-unit tokens may be generated.

Encoding is performed on the input sequence (2200).

Encoding may be performed in the POS tagger 230 of the POS tagging system 200 or the preprocessor 320 of the natural language processing system 300.

For example, the encoding may include a first encoding which is global encoding on the entire sentence, and a second encoding which is encoding of sequential context information.

To this end, the POS tagging model may include a first encoder performing the first encoding, and a second encoder performing the second encoding. A plurality of hidden states encoded in the first encoder may be used as an input of the second encoder.

The first encoder may be implemented as a pre-trained language model (PLM). For example, the first encoder may employ one of the PLMs such as efficiently learning an encoder that classifies token replacements accurately (ELECTRA), bidirectional encoder representations from transformers (BERT), generative pre-trained transformer (GPT), and the like.

The second encoder may be implemented as a recurrent neural network (RNN). For example, the second encoder is implemented as a bidirectional simple recurrent units++ (SRU++) that enables faster calculation and more effective abstraction, to sequentially encode hidden states.

An encoding result is input to each of a first discriminator and a second discriminator (2300).

A hidden state for each token (e.g., an output of the second encoder) is input to both the first discriminator and the second discriminator. That is, the first discriminator and the second discriminator may share the input.

The first discriminator may output a POS tagging result (2400), and the second discriminator may output a spacing result (2500).

Both the first discriminator and the second discriminator may include a conditional random field (CRF) layer.

The CRF layer of the first discriminator may output POS information matching each token constituting the input sequence, as a probability value (for example, a probability value that a corresponding token matches a noun, a probability value that a corresponding token matches a verb, etc.). Also, the first discriminator may discriminate a POS that matches each token, based on the probability value output from the CRF layer. For example, a POS having a largest probability value may be determined as a POS matching the corresponding token.

The CRF layer of the second discriminator may output a probability value that each token constituting the input sequence corresponds to a boundary of spacing, and the second discriminator may discriminate whether each token corresponds to a boundary of spacing, based on the probability value output from the CRF layer.

As is apparent from the above, according to the embodiments of the disclosure, even when a spacing error is included in a speech or text input by a user or a spacing error occurs while converting an input speech into text, the POS tagging system, the natural language processing system, and the POS tagging method can obtain morpheme analysis and POS tagging results robust to a spacing error by using the POS tagging model that learns spacing together with POS tagging.

Meanwhile, embodiments of the method of training the POS tagging model and the POS tagging method using the trained POS tagging model can be stored in the form of a recording medium storing computer-executable instructions. The instructions may be stored in the form of a program code, and when executed by a processor, the instructions may perform operations of the disclosed embodiments.

The recording medium may be implemented as a computer-readable recording medium. Here, the recording medium may be a non-transitory computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A method comprising:
separating an input sentence into units of syllables to generate an input sequence;
encoding, using at least one encoder included in a part-of-speech (POS) tagging model, the input sequence, wherein the encoding the input sequence comprises:
performing global encoding by inputting the input sequence to a first encoder; and
performing encoding based on a word order by inputting an output of the first encoder to a second encoder;
generating, based on the encoded input sequence and using a first discriminator included in the POS tagging model, a POS tagging result; and
generating, based on the encoded input sequence and using a second discriminator included in the POS tagging model, a spacing result.

2. The method of claim 1, further comprising:
calculating a first loss value on the POS tagging result; and
calculating a second loss value on the spacing result.

3. The method of claim 2, further comprising:
calculating a total loss value by summing the first loss value and the second loss value; and
adjusting parameters of the POS tagging model based on the total loss value.

4. The method of claim 1, wherein the at least one encoder included in the POS tagging model comprises the first encoder and the second encoder.

5. The method of claim 1, wherein the first encoder includes a pre-trained language model.

6. The method of claim 1, wherein the second encoder includes a bidirectional simple recurrent unit (SRU).

7. The method of claim 1, wherein the first discriminator includes a conditional random field (CRF) layer.

8. The method of claim 1, wherein the second discriminator includes a conditional random field (CRF) layer.

9. An apparatus comprising:
one or more processors; and
memory storing instructions that, when executed by the one or more processors, cause the apparatus to:
separate an input sentence into units of syllables to generate an input sequence;
encode, using at least one encoder included in a part-of-speech (POS) tagging model, the input sequence by:
performing global encoding by inputting the input sequence to a first encoder; and
performing encoding based on a word order by inputting an output of the first encoder to a second encoder;
generate, based on the encoded input sequence and using a first discriminator included in the POS tagging model, a POS tagging result; and
generate, based on the encoded input sequence and using a second discriminator included in the POS tagging model, a spacing result.

10. The apparatus of claim 9, wherein the at least one encoder included in the POS tagging model comprises the first encoder and the second encoder.

11. The apparatus of claim 9, wherein the first encoder includes a pre-trained language model.

12. The apparatus of claim 9, wherein the second encoder includes a bidirectional simple recurrent unit (SRU).

13. The apparatus of claim 9, wherein the first discriminator includes a conditional random field (CRF) layer.

14. The apparatus of claim 9, wherein the second discriminator includes a conditional random field (CRF) layer.

15. A non-transitory computer-readable medium storing instructions that, when executed by one or more processors, cause:
separating an input sentence into units of syllables to generate an input sequence;
encoding, using at least one encoder included in a part-of-speech (POS) tagging model, the input sequence by:
performing global encoding by inputting the input sequence to a first encoder; and
performing encoding based on a word order by inputting an output of the first encoder to a second encoder;
generating, based on the encoded input sequence and using a first discriminator included in the POS tagging model, a POS tagging result; and
generating, based on the encoded input sequence and using a second discriminator included in the POS tagging model, a spacing result.

16. The non-transitory computer-readable medium of claim 15, wherein the instructions, when executed by the one or more processors, further cause:
calculating a first loss value on the POS tagging result; and
calculating a second loss value on the spacing result.

17. The non-transitory computer-readable medium of claim 16, wherein the instructions, when executed by the one or more processors, further cause:
calculating a total loss value by summing the first loss value and the second loss value; and adjusting parameters of the POS tagging model based on the total loss value.

18. The non-transitory computer-readable medium of claim 15, wherein the at least one encoder included in the POS tagging model comprises the first encoder and the second encoder.

19. The non-transitory computer-readable medium of claim 15, wherein the first encoder includes a pre-trained language model, and wherein the second encoder includes a bidirectional simple recurrent unit (SRU).

20. The non-transitory computer-readable medium of claim 15, wherein each of the first discriminator and the second discriminator includes a conditional random field (CRF) layer.

* * * * *